US007003002B2

(12) United States Patent
Vahala et al.

(10) Patent No.: US 7,003,002 B2
(45) Date of Patent: *Feb. 21, 2006

(54) FIBER-COUPLED MICROSPHERE RAMAN LASER

(75) Inventors: Kerry J. Vahala, Pasadena, CA (US); Sean M. Spillane, Pasadena, CA (US); Tobias J. Kippenberg, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/967,515

(22) Filed: Oct. 18, 2004

(65) Prior Publication Data

US 2006/0002432 A1 Jan. 5, 2006

Related U.S. Application Data

(62) Division of application No. 10/193,023, filed on Jul. 9, 2002, now Pat. No. 6,891,864.

(60) Provisional application No. 60/304,224, filed on Jul. 9, 2001.

(51) Int. Cl.
*H01S 3/30* (2006.01)
*H01S 3/08* (2006.01)

(52) U.S. Cl. .......................................... 372/3; 372/92
(58) Field of Classification Search .................. 372/3, 372/6, 92, 94, 108
See application file for complete search history.

(56) References Cited

U.S. PATENT DOCUMENTS

| | | | |
|---|---|---|---|
| 6,009,115 A | 12/1999 | Ho | |
| 6,389,197 B1 | 5/2002 | Itchenko et al. | |
| 6,487,122 B1 | 11/2002 | Maleki et al. | |
| 6,580,851 B1 | 6/2003 | Vahala et al. | |
| 6,741,628 B1 | 5/2004 | Painter et al. | |
| 2001/0033587 A1 | 10/2001 | Painter et al. | |
| 2003/0002099 A1 | 1/2003 | Sayyah et al. | |
| 2003/0021301 A1 * | 1/2003 | Vahala et al. ................ | 372/3 |

* cited by examiner

*Primary Examiner*—James Menefee
(74) *Attorney, Agent, or Firm*—Bingham McCutchen LLP

(57) ABSTRACT

The present invention is a Raman laser and methods related thereto. In the preferred embodiments, the Raman laser comprises a laser pump signal in a fiber waveguide which is optically coupled to a micro-resonator through a fiber taper. The micro-resonator is constructed from a material that has a high Q when it is formed into a micro-resonator and is phase matched to the waveguide. The lasing frequency can be determined based upon the pump input or the micro-resonator material. In the preferred embodiments, the micro-resonator is constructed from a fused silica material. The present invention provides a compact laser with improved emissions and coupling efficiencies and the ability to use stimulated Raman scattering effects to create lasers having frequencies that are otherwise difficult to obtain. Alternative configurations include multiple micro-resonators on a single fiber waveguide and/or utilizing multiple waveguides attached to one or more micro-resonators. The Raman laser can be made to operate in a continuous-wave as opposed to self-pulsing mode.

12 Claims, 7 Drawing Sheets

FIBER-COUPLED MICROSPHERE RAMAN LASER

This application is a divisional of U.S. application Ser. No. 10/193,023, filed Jul. 9, 2002 now U.S. Pat. No. 6,891,864, priority which is claimed under 35 U.S.C. § 120, which claims priority under 35 U.S.C. § 119 to U.S. provisional Application No. 60/304,224, filed Jul. 9, 2001, and entitled "Fiber-Coupled Microsphere Raman Laser." The disclosures of the foregoing are incorporated by reference herein as if set forth in full hereat.

The U.S. Government has certain rights in this invention pursuant to Grant No. N00014-99-1-0661 awarded by the United States Office of Naval Research.

FIELD OF INVENTION

The field of the invention relates to lasers and certain related methods, and in particular to Raman lasers and related methods.

BACKGROUND OF THE INVENTION

The frequency of the output of a laser can be important to its use and functioning. By way of example, currently, the telecommunications industry uses frequencies in the 1550 nm range. Indeed, specific frequency outputs are often needed for both scientific research as well as commercial applications. As such, much time and effort has been spent attempting to utilize the stimulated Raman scattering effect (SRS) to produce lasers having a particular frequency output. The present invention describes a new implementation of SRS, interchangeably referred to herein as a Raman laser, and related methods. The SRS is a result of the scattering of a light photon by a molecule into a lower energy photon, with the resulting energy going into vibration of the molecule. This results in a shift of the input light beam to a longer wavelength, where the shift is dependent on the Raman gain medium used for implementing the SRS and the pump wavelength.

"SRS sources may be helpful in extending the available range of semiconductor lasers, particularly to hard to access frequencies. Raman lasers have been made in a number of geometries, ranging from standard laser cavities made up of a Fabry-Perot cavity (similar to two flat mirrors and a Raman gain medium), to cavities based on a length of optical fiber with Bragg "mirros" (reflectors made in an optical fiber). The Raman effect is a nonlinear optic effect, i.e., the strength of the effect scales with the intensity of the input light wave. As such, efficient generation of Raman light requires very high pump power, and is typically generated using macroscale devices.

A discussion of some of the efforts in this area can be found in U.S. patent application publication number US21010696A1, published on Aug. 1, 2001, the contents of which are incorporated herein by reference. Early work in this area, for example, Qian, S. X., Chang, R. K. Multiorder Stokes Emission from Micrometer-Size Droplets. Phys. Rev. Lett. 56, 926–929 (1986); and, Lin, H. B., Huston, A. L. Eversole, J. D., Campillo, A. J. Double-resonance stimulated Raman-scattering in micrometer-sized droplets. J. Opt. Soc. Am. B 7, 2079–2089 (1990), the disclosures of which are incorporated herein be reference, also relied on the use of Raman excitation in mircodroplets—but microdroplets have not been found to be useful in practical applications. Thus, there is a need fro a self-contained device and related methods which can produce a lased output in a frequency range of interest.

It is known to one of skill in the art how to couple a waveguide to an optical resonator so as to transfer optical power to the resonator from the waveguide or from the waveguide to the resonator. It is also known to one of skill in the art that power circulates in a resonator preferentially at resonant frequencies corresponding to optical modes of the resonator. Likewise the principles associated with the use of mirco-resonators and transverse optical coupling through a fiber taper are understood to one of skill in the art. The following references provide additional information on these and certain related issues, the disclosure of each of which is incorporated by reference herein as if set forth in full hereat: Laine J P, Little B E, Lim D R, et al., Planar integrated wavelength-drop device based on pedestal anti-resonant reflecting waveguides and high-Q silica microspheres, OPT LETT 25 (22): 1636–1638 Nov. 15, 2000; Laine J P, Little B E, Lim D R, et al., Microsphere resonator mode characterization by pedestal anti-resonant reflecting waveguide coupler, IEEE PHOTONIC TECH L 12 (8): 1004–1006 August 2000; Yariv, et. al., U.S. patent application Ser. No. 09/454,719, for "Resonant optical wave power control devices and method", filed on Dec. 7, 1999, the contents of which are incorporated herein in full by reference.

Other references of interest include: Vahala, et. al, Micro-Cavity Laser, U.S. patent application Ser. No. 09/802,442, Filed on Mar. 9, 2001; Collot, L., Lefevre-Seguin, V., Brune, M., Raimond, J. M., Haroche, S. Very High-Q Whispering-Gallery Mode Resonances Observed on Fused Silica Microspheres. Europhys. Lett. 23, 327–334 (1993); Braunstein, D., Khazanov, A. M., Koganov, G. A., Shuker, R. Lowering of threshold conditions for nonlinear effects in a microsphere. Phys. Rev. A 53, 3565–3572 (1996); Knight, J. C., Cheung, G., Jacques, F., Birks, T. A. Phase-matched excitation of whispering-gallery-mode resonances by a fiber taper. Optics Letters 22, 1129–1131 (1997); Chang, R. K., Campillo, A. J. (ed.) Optical Processes in Microcavities (World Scientific, Singapore, 1996); Gorodetsky, M. L., Savchenkov, A. A., Ilchenko, V. S. Ultimate Q of optical microsphere resonators. Optics Letters 21, 453–455 (1996); Weiss, D. S. et al. Splitting of high-Q Mie modes induced by light backscattering in silica microspheres. Optics Letters 20, 1835–1837 (1995); Lai, H. M., Leung, P. T., Young, K., Barber, P. W., Hill, S. C. Time-independent perturbation for leaking electromagnetic modes in open systems with application to resonances in microdroplets. Phys. Rev. A 41, 5187–5198 (1990); Zhang, J. Z., Chang, R. K. Generation and Suppression of Stimulated Brillouin Scattering in Single Liquid Droplets. J. Opt. Soc. Am. B 6, 151–153 (1989); Cai, M., Painter, O., Vahala, K. J. Observation of Critical Coupling in a Fiber Taper to a Silica-Microsphere Whispering-Gallery Mode System. Phys. Rev. Lett. 85, 74–77 (2000); Lin, H. B., Campillo, A. J. CW Nonlinear Optics in Droplet Microcavities Displaying Enhanced Gain. Phys. Rev. Lett. 73, 2440–2443 (1994); Ilchenko, V. S., Gorodetskii, M. L. Thermal Nonlinear Effects in Optical Whispering Gallery Microresonators. Laser Physics 2, 1004–1009 (1992); Vernooy, D. W., Ilchenko, V. S., Mabuchi, H., Steed, E. W., Kimble, H. J. High-Q measurements of fused-silica microspheres in the near infrared. Optics Letters 23, 247–249 (1998); Bachor, H.-A., Levenson, M. D., Walls, D. F., Perlmutter, S. H., Shelby, R. M. Quantum nondemolition measurements in an optical-fiber ring resonator. Phys. Rev. A 38, 180–190 (1988); Silberhorn, Ch., Lam, P. K., Weiss, O., Koenig, F., Korolkova, N., Leuchs, G. Generation of Continuous Variable Einstein-Podolsky-Rosen Entanglement via the Kerr Nonlinearity in an Optical Fiber. Phys.

Rev. Lett. 86, 4267–4270 (2001); Treussart, F. et al. Evidence of the intrinsic Kerr bistability of high-Q microsphere resonators in superfluid helium. Eur. Phys. J. D 1. 235–238 (1998); Fan, X., Palinginis, P., Lacey, S., Wang, H., Lonergan, M. C. Coupling semiconductor nanocrystals to a fused-silica microsphere: a quantum-dot microcavity with extremely high Q factors. Opt. Lett. 25, 1600–1602 (2000) —the disclosures of each of the foregoing are incorporated herein by reference as if set forth in full hereat.)

Finally, there is a hydrogen/iodine-gas filled fabry-perot cavity Raman laser reported in the literature. See, e.g., Brasseur J K, Teehan R F, Knize R J, et al., *Phase and frequency stabilization of a pump laser to a raman active resonator*, IEEE J QUANTUM ELECT 37 (8): 1075–1083 AUG 2001; and Meng L S, Roos P A, Repasky K S, et al., *High-conversion-efficiency, diode-pumped continuous-wave Raman laser*, OPT LETT 26 (7): 426–428 Apr. 1, 2001.

One of the many disadvantages of the approaches of the prior art is that the Raman wavelength shift is very narrow, i.e. it only attains a very specific shift with a given pump frequency, whereas the present invention possesses a much broader gain spectrum, thus allowing tunablity by controlling resonator geometry. Additionally, the devices are often quite complicated.

Limitations of these and other devices include a limited ability to obtain desired output frequencies, high threshold power requirements, low emission and coupling efficiencies and large and/or highly complicated and expensive devices.

The preferred embodiment of the present invention overcomes these and the other limitations of the prior art by providing a compact, self-contained Raman laser source that, in the preferred embodiment, is directly coupled to an optical fiber waveguide. Indeed, the present invention can be entirely constructed from ordinary optical fiber. Optical fibers, in addition to being very important in modern optical communications systems, provide a very convenient means to convey both optical pump power to the laser and to convey emitted laser radiation from a Raman laser resonator. The ability to utilize stimulated Raman scattering effect to produce a Raman Laser output of a desired frequency output which is directly coupled to an optical fiber is therefore of great practical significance.

SUMMARY OF THE INVENTION

The present invention is directed to a Raman laser and certain related methods. The devices and methods of the present invention are useful for creating laser signals having a frequency within a desired range by optically coupling an optical pump signal in a waveguide to a micro-cavity optical resonator in a manner which will produce stimulated Raman Scattering effect ("SRS"). The amount of SRS is dependent on the relative positioning of the waveguide to the micro-cavity resonator, the characteristics (high-Q and size) of the micro-resonator and the frequency of the laser pump source. The preferred embodiment of the present invention provides an SRS source (i.e. a Raman Laser) consisting of a high-Q silica microsphere coupled to an optical fiber, preferably by means of a transverse optical coupling. A laser pump source is optically coupled to the waveguide. This embodiment enables a large reduction in the necessary threshold pump power, while fiber-coupling notably improves overall efficiency and provides a convenient method of optical field transport.

Of all cavity geometries, micrometer-sized dielectric spherical resonators are believed to be one of the best in terms of their ability to store energy for long periods of time within small volumes. In the sphere, light orbits near the surface, where long confinement times (high Q) effectively wrap a large interaction distance into a tiny volume. In this configuration, the physics within the sphere enters a non-linear regime wherein conventional rules for light propagation break down. In the preferred embodiment, the molecules of the glass bead itself are distorted, resulting in a process called Raman emission and lasing. Because Raman lasers require enormous intensities to function, they are usually power-hungry devices. The present invention uses the physics of the sphere to reduce both power and size. These characteristics also make such resonators suited for studies of nonlinear coupling of light with matter. Fused Silica was chosen as the material for constructing a prototype in the laboratory, due to its low loss and high Q factor when formed into a microsphere, although it has much lower non-linear gain coefficients than compared to those of molecular liquids (e.g., 1000 times lower for SRS).

The output frequency of the present invention can be tuned both by design (e.g., based on the positioning of the fiber waveguide relative to the micro-resonator and/or the choice of material from which to construct the micro-resonator) and dynamically (by varying the frequency of the laser pump signal). It is possible to write a grating directly on a micro-resonator, which can provide tuning mechanisms. It is also possible to change the output frequency by slightly changing the size, through for example heating the resonator or deforming it slightly.

Thus, the present invention represents an overall improvement on the order of 106 times over prior devices based on spherical droplets and provides a route to compact, ultra-low threshold sources for numerous wavelength bands that are usually difficult to access. Equally important, this system can provide a compact and simple building block for studying nonlinear optical effects and the quantum aspects of light. Each of the preferred embodiments can be made to be robust and easy to implement in a variety of configurations and uses. Finally, the ability to fiber-couple should enable easy scaling to multiple resonant systems along a single fiber.

Accordingly, it is an object of the present invention to provide a Raman laser having the advantages detailed herein.

This and other objects of the invention will become apparent to those skilled in the art from a review of the materials contained herein.

BRIEF DESCRIPTION OF THE DRAWINGS

The accompanying drawings, which are incorporated in, and constitute a part of the Specification, illustrate presently known preferred embodiments of the present invention, and together with the proceeding general description and the following Detailed Description, explain the principles of the invention.

In the drawings.

DETAILED DESCRIPTION OF THE INVENTION

For the purposes of discussion the terms resonance and optical mode will be used interchangeably herein. Likewise, the terms micro-cavity resonator and micro-resonator will be used interchangeably herein. Of all cavity geometries, micrometer-sized dielectric spherical resonators are believed to be one of the best in terms of their ability to store energy for long periods of time within small volumes. In the sphere, light orbits near the surface, where long confinement times (high Q) effectively wrap a large interaction distance into a tiny volume. In this configuration, the physics within the sphere enters a nonlinear regime wherein conventional rules for light propagation break down. In the preferred embodiment, the molecules of the glass bead itself are distorted, resulting in a process called Raman emission and lasing. Because Raman lasers require enormous intensities to function, they are usually power-hungry devices. The present invention uses the physics of the micro-resonator to reduce both power and size. Fused Silica was chosen as the material for constructing a prototype in the laboratory, due to its low loss and high Q factor when formed into a microsphere, although it has much lower nonlinear gain coefficients than compared to those of molecular liquids (e.g., 1000 times lower for SRS).

Referring hereafter to the figures generally, the present invention is a compact and highly efficient Raman laser. In its preferred embodiment, the present invention utilizes transmission media 4; high-Q micro-cavity optical resonators 6; and, optical pumps to excite the stimulated Raman scattering effect in the micro-resonators 6. As described below and as will be understood by those skilled in the art, numerous additional implementations of this structure and/or method can be made without departing from the scope or spirit of the invention as described herein.

Figure 1:
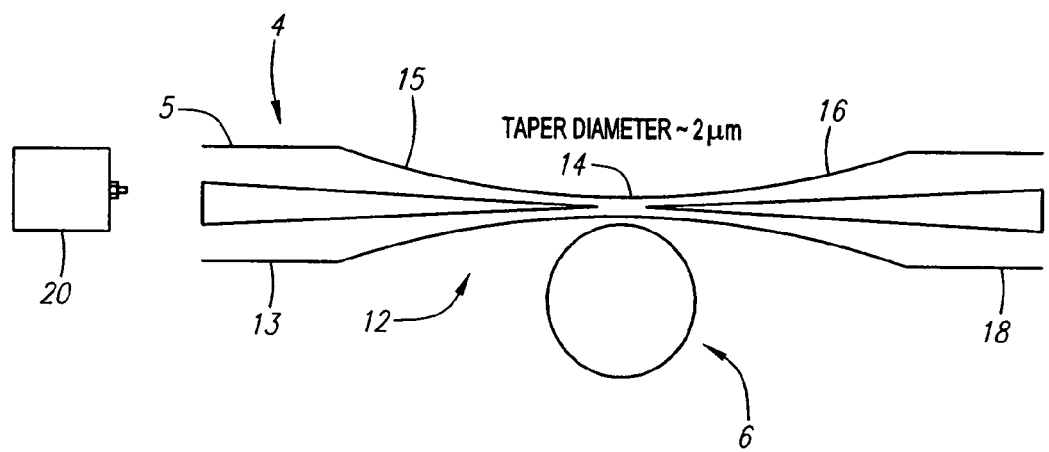
FIG. 1 is a plan view illustration of a fiber taper and a micro-cavity resonator of the present invention.
Figure 2:
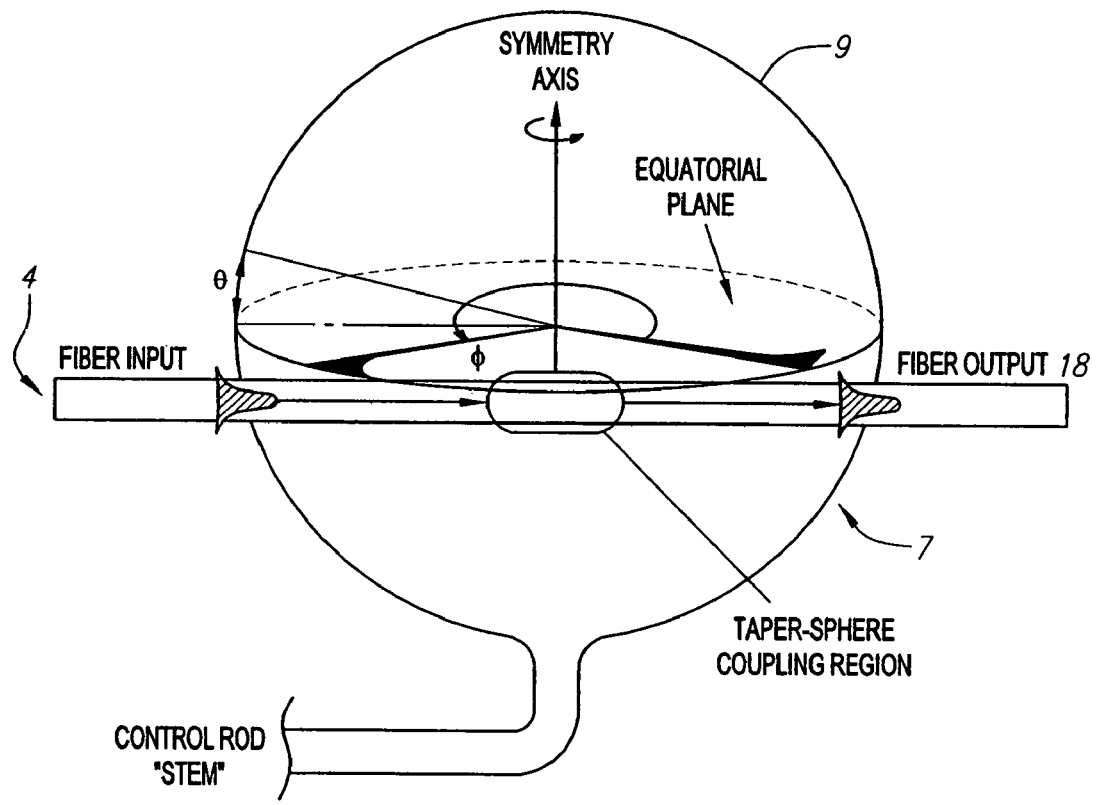
FIG. 2 is an illustration of a fiber taper coupled with the equator of a microsphere micro-cavity resonator of a preferred embodiment of the present invention.

The transmission media 4 is preferably a fiber waveguide 5 of any type. This includes, without limitation, cylindrical, elliptical, etched, "D"-shape and "panda" fiber configurations as well as polished fiber half-blocks. In the preferred embodiment, a fiber taper 12 is provided in the fiber waveguide 5 between a first portion or end 13 and a second portion or end 18 of the fiber waveguide 5, as is best illustrated in FIG. 1. The tapered sections, 15, 16 and intermediate waist region 14 of the waveguide may be provided, as is known, by stretching the waveguide under controllable tension as it is softened by one or more fixed or movable heat sources (e.g., torches). In the preferred embodiment, the waist region of the fiber taper is approximately 1–2 micrometers in diameter as is illustrated in FIG. 2. Commercially available machines can be used to produce the fiber tapers in production environments.

The consequent reduction in diameter of about one or more orders of magnitude reduces the central core in the core/cladding structure of the optical fiber to vestigial size and function, such that the core no longer serves to propagate the majority of the wave energy. Instead, without significant loss, the wave power in the full diameter fiber transitions into the waist region, where power is confined both within the attenuated cladding material and within a field emanating into the surrounding environment. In essence, this allows the light inside the fiber to leak into the microsphere and build up. The advantages of this technique are that the light which leaks into the resonator is concentrated, so the circulating intensity is very high. Furthermore, with this method we have control over the properties of the light we transfer into the microsphere, thus allowing control over the output Raman light. Another advantage is that the device is fiber-coupled, which allows compatibility with standard fiber-optic technology. This allows very low loss entering and exiting the device.

After propagating through the waist region 14, exterior wave power is recaptured in the diverging tapered region 16 and is again propagated with low loss within the second fiber section 18.

In the preferred embodiment, at least one high Q resonator 6 is coupled to the externally guided power about the waist region 14 of the waveguide. A pump laser source 20 is coupled to the first portion 13 of the fiber 5. That is, at all times there is a coupling interaction of the pump 20 output from the principal fiber 5 into the interior of the resonator 6 through the fiber taper 12 via the resonator periphery. Other means of transverse coupling known to those of skill in the art, including through prisms, etc., can also be used to transversely couple the fiber 5 to the micro-resonator 6.

The resonator 6 additively recirculates the energy with low loss in the whispering gallery mode ("WGM" or WG mode"), returning a part of the power to the waveguide at the waist 14. When a resonance exists at the chosen wavelength, the resonator 6 functions with effectively total internal reflection and with minimal internal attenuation and radiative losses. However, the emanating portion of the wave power is still confined and guided, so it is presented for coupling back into the waveguide waist 14. Extremely high Q values (as much as 8 billion have been observed) exist in this whispering gallery mode. Different micro-resonators 6 can be used for the present invention, including disks, rings, polygons, oblate and prolate spheroids. Furthermore, concentricity or approximate concentricity may in some instances not be necessary, since the WGM effect can exist in non-concentric boundary structures such as ellipses or race-track structures. Non-concentric boundary structures can also be used as micro-resonators in order to obtain particular frequencies of interest.

In the present invention, the resonator 6 is preferably constructed from a silica material. This provides the advantage of being phase matched with many waveguide structures. Alternatively, resonators can be constructed in a semiconductor, utilizing any of the resonator configurations (e.g., disks, rings, polygons, oblate and prolate spheroids) discussed herein. Depending on the application in which the laser of the present invention might serve and/or the desired frequency bandwidth of the output, the material from which the resonator is constructed may also include one or more additives (for example and without limitation, phosphate) intended to suppress undesirable higher order modes and/or resonances in the resonator 6 at frequencies outside of the desired output bandwidth.

The lasing threshold occurs when cavity round-trip gain equals round-trip loss. For an intensity-dependent gain coefficient (such as for a Raman laser), and taking into account the power build-up factor in a resonator, the following equation for threshold pump power was obtained:

$$P_{THRESHOLD} = \frac{\pi^2 n^2}{\lambda_P \lambda_R} \frac{V_{eff}}{\Gamma B g} Q_e^P \left(\frac{1}{Q_T^P}\right)^2 \frac{1}{Q_T^R} \quad (1)$$

Here, $P_{threshold}$ denotes the incident power necessary in the fiber (not the power coupled into the resonator), n is the index of refraction, $V_{eff}$ is the effective pump mode volume (i.e. that is, taking the full width at half-max of the intensity distribution), $\lambda_P$ and $\lambda_R$ are the pump and Raman wavelengths, Γ is the spatial mode overlap factor between pump and Raman modes (Γ~1), g is the nonlinear bulk Raman gain coefficient, B is a correction factor of the circulating power due to internal backscattering (between 1 and ½), and $Q^P_T$ is the total quality factor for the pump mode, made up of an intrinsic contribution $Q^P_o$ and a coupling contribution $Q^P_e$ (and similarly for the Raman mode). Equation (1) has the important feature that the threshold pump power scales inversely with the factor $Q^2/V$, which is the same as quality factor multiplied by the cavity Purcell factor ($\propto Q/V$). Thus the microresonator quality factor plays a significant role in the resulting performance and efficiencies which can be achieved with the present invention, resulting from the necessity of a doubly resonant process.

The present invention also utilizes an alignment structure in order to secure the position of the fiber waveguide 5 relative to the micro-cavity resonator 6. Many types of alignment structures are known to those of ordinary skill in the art and may include, without limitation, an etched substrate or the like. The taper position is preferably controlled relative to the microsphere by a three-axis stage (not shown) with a resolution of 20 nm. A tunable 1550-nm external-cavity diode laser with 300 kHz linewidth is used as a pump 20. The pump laser 20 is scanned repeatedly through a frequency range of approximately 60 GHz around a single whispering gallery mode (WGM).

To induce a lasing action in the present invention, an excitation signal must be provided to the resonator 6. In the first preferred embodiment, an optical pump 20 is provided to deliver the excitation signal to the resonator 6. Alternative schemes of delivering an excitation sources (e.g., and without limitation, by beam excitation including guided or unguided electrical and/or unguided light beams) can be employed without departing from the scope of the present invention.

Figure 7:
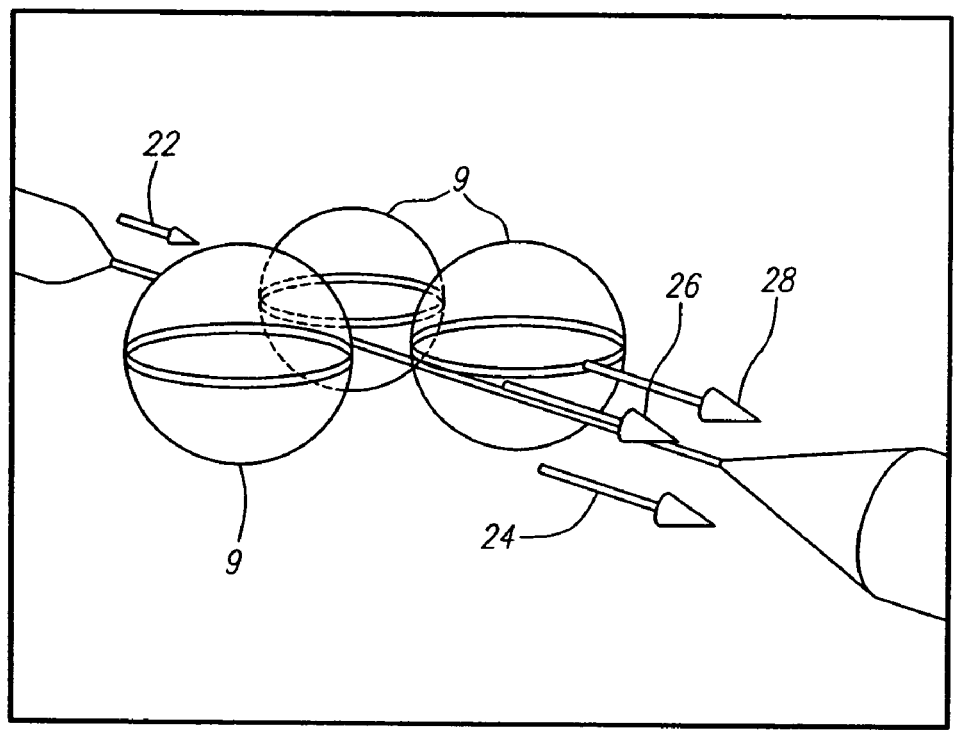

Without limiting the foregoing, in the first preferred embodiment an optical pump 20 is optically connected to a first end of the fiber waveguide 5. The optical pump 20 transmits a signal along the waveguide 5 and to the resonator 6 through the fiber taper 12 as discussed above. One or more excited laser signals in the resonator 6 are then communicated to the fiber waveguide 5 propagating both in the direction of the second end 18 of the waveguide as illustrated in FIGS. 1 and 7. In an alternative embodiment where the resonator is constructed from a semiconductor, the resonator 6 is preferably pumped by an electrical excitation signal rather than an optical signal, however, pumping in this configuration by a guided or unguided optical or alternative signal beam is also intended to be included within the scope of the present invention.

A significant advantage of the present invention over the work of others is the ability to couple directly to and from the optical fiber 5. Important to this coupling is the ability to "phase match" the fiber taper 12 and the resonator structure 6 to maximize the coupling efficiency. This is done by proper selection of the diameter of the fiber taper 12 at the waist region 14. In so doing, it is possible to match the effective indexes of the fundamental taper mode and the fundamental mode of the resonator 6 (i.e., "phase matching"). This is important as it maximizes the efficiency of the transfer of power and thereby lowers the operating threshold of the present invention.

As is best illustrated in FIG. 2, where the resonator 6 is a microsphere 7, a 50 micron diameter microsphere γphase matches a 1.38 micron diameter fiber taper 12. In the present invention, it is possible to demonstrate critical coupling with 26-dB on-resonance extinction and a matched dual-taper add-drop filter with less than 0.5% scattering loss and near-unity power transfer (on-resonance) between a fiber taper 12 and a micro-cavity resonator 6, where the resonator is a microsphere resonator 7.

A laser of the present invention has been constructed and tested in the laboratory, and is described more fully below. It will be appreciated that this embodiment is but one of many embodiments of the invention disclosed and claimed herein and is described as the currently known best mode of the present invention rather than as a limitation of the invention itself.

Figure 3:
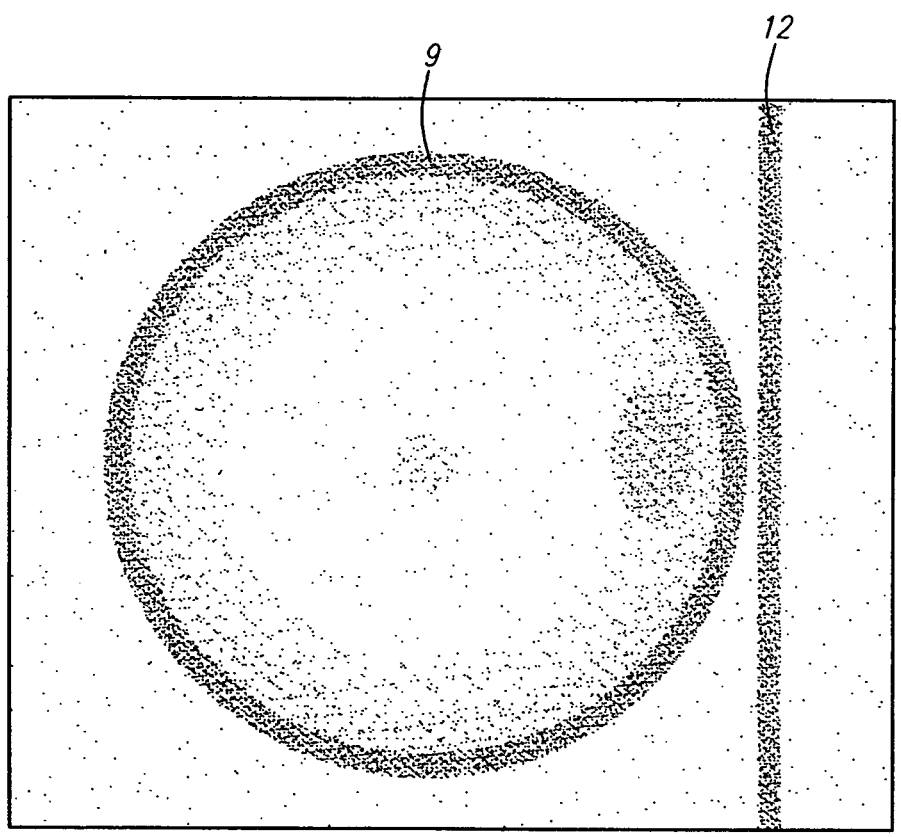
FIG. 3 is an image of a fiber taper in contact with a microsphere resonator of a preferred embodiment of the present invention (inset from FIG. 2 in paper)

In this embodiment and referring to all of the figures generally, and to FIGS. 2 and 3 in particular, a fiber taper 12 is placed in contact with the microsphere 9, to form a compact, low-threshold Raman fiber laser source. A single fiber taper 12 is used to guide the pump 20 laser beam to the surface of the microsphere 9, resonantly couple the pump 20 into the sphere 9, and then collect the resulting Raman laser emission. The use of a fiber taper 12 not only provides an efficient input and output coupling port but also plays an important role in producing single-mode lasing.

Finally, the fiber taper 12 forms a natural backbone for connecting a series of different active and passive micro-cavity devices, with each device addressing a different wavelength signal. These additional micro-cavity devices can be resonators, modulators, add/drop filters, slicers, or any other device which can optically connected to the fiber waveguide 5, preferably through the fiber taper 12 or one or more additional fiber tapers on the fiber waveguide 5 so as to make such connections without breaking the fiber waveguide 5.

Figure 4:
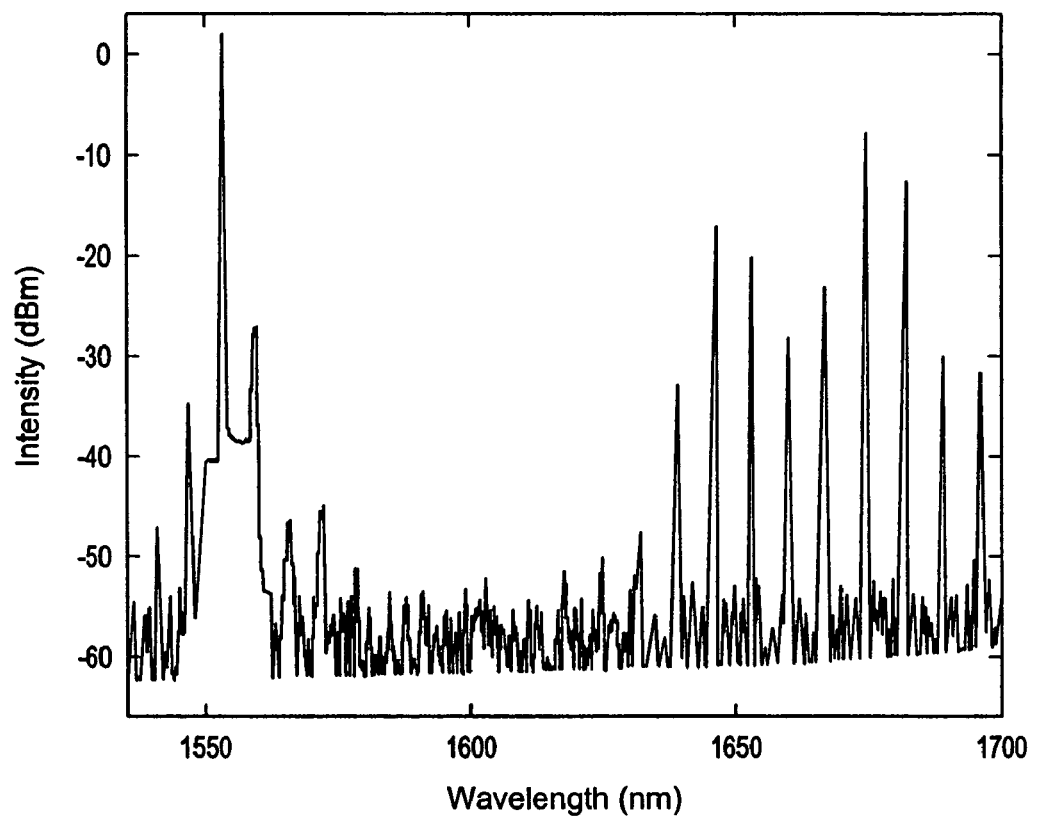
FIG. 4 is a graph which illustrates the spectrum of a 70-micrometer diameter Raman microsphere laser with pump powers of 2 mW.

FIG. 4 shows the emission spectrum for a Raman microsphere laser (intrinsic pump quality factor of $Q_o=10^8$) excited far above the threshold for stimulated Raman scattering. There are a multitude of nonlinearly generated wavelengths, from stimulated Raman peaks centered around 1670 nm to Raman-assisted four-wave mixing (FWM) peaks located symmetrically about the 1550-nm pump. Stimulated Raman scattering has a very high threshold (nonlinear gain coefficient of 10–11 cm/W), requiring significant circulating pump powers. This suggested that other nonlinear processes having lower thresholds such as stimulated Brillouin scattering (SBS) could also be present in the systems tested. SBS, for example, should have a threshold roughly 500 times lower than stimulated Raman scattering (nonlinear gain coefficient is 500 times larger). To determine the presence of SBS, an optical spectrum analyzer was used to measure backward propagating optical power coupled from the microresonator into the fiber taper. The gain spectrum for SBS is very narrow (<100 MHz) with a roughly 10 GHz frequency downshift in silica. The micro-resonators tested here have free spectral ranges on the order of terahertz, with an eccentricity splitting of the azimuthal modes on the gigahertz scale. In general this splitting is dependent upon fabrication-induced irregularities, thus overlap with the SBS spectrum is unlikely. Consequently, SBS was only observed when a WGM overlapped the Brillouin gain spectrum, in agreement with experiments on liquid droplets. However, the backward spectral monitor did show the expected strong Raman oscillation. Cascaded Raman peaks, if present, were not observable due to the wavelength range of our optical spectrum analyzer. We note that four-wave-mixing associated with the Kerr effect was also observed. However, such processes in micro-cavities are governed by strict conditions imposed by the combined effect of the phase-matching requirement with the WGM spectral structure.

Figure 5:
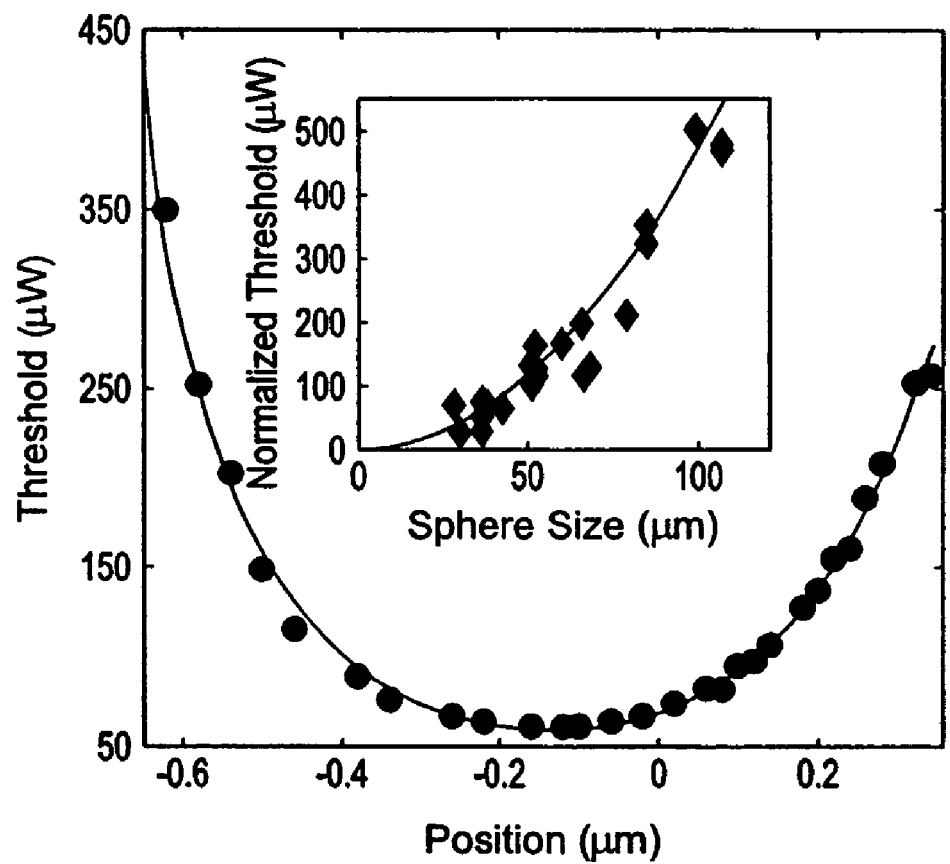
FIG. 5 depicts a graph which illustrates the coupling gap and size dependence of the Raman threshold where the position is measured from the critical coupling point and where negative values correspond to the undercoupled regime. Inset in the main graph is a second graph illustrating that the normalized minimum threshold versus sphere size follows a quadratic dependence.

To investigate the dependence on quality factor, the threshold was measured while varying the coupling between the taper and microsphere by changing the air gap (FIG. 5). The data follow a near parabolic shape with a measured minimum value of 62 microW. A theoretical fit, based on exponential dependence of the coupling Q, shows excellent agreement. We also obtain good agreement with a calculated minimum threshold value of 50 microW under the assumption that Raman mode Q is equal to pump mode Q. The minimum threshold does not lie at the critical coupling point, where circulating pump power (Raman gain) is largest. It in fact occurs for the system in a slightly undercoupled state (weaker coupling than at the critical point), corresponding to an observed pump transmission of 12%. This shift results from the interplay between Raman gain and loss, resulting from the coupling of both the pump and Raman wave to the fiber waveguide. In the simplified case where the quality factors of pump and oscillating modes are equal the theoretical minimum occurs for a pump power transmission of 11%, in good agreement with the experimental value.

Examining the threshold (equation (1) above), the threshold is expected to scale approximately as radius squared (effective mode volume is nearly quadratic in radius). To investigate this, the minimum threshold for various sphere diameters ranging from 28 to 110 micrometers was measured (FIG. 5 inset). The threshold indeed follows a quadratic dependence on size. The dependence on quality factor is normalized out (assuming pump and Raman Q's are identical) due to its strong effect on threshold.

Figure 6:
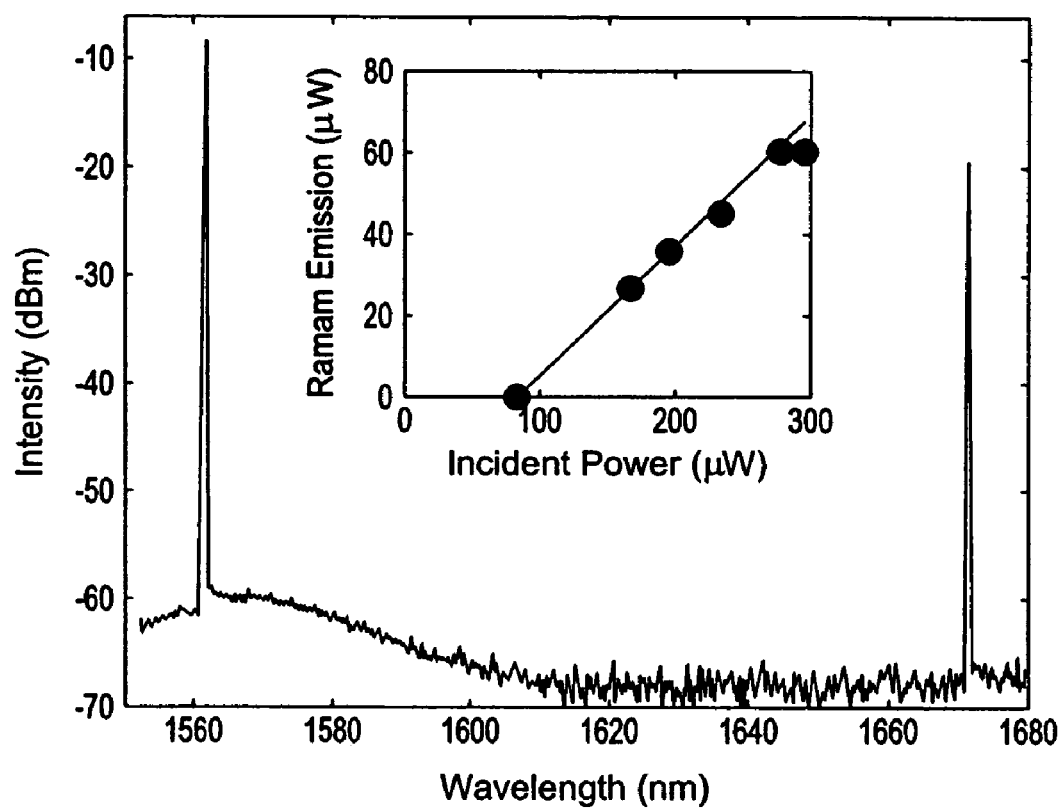
FIG. 6 is a graph illustrating single longitudinal mode Raman lasing. Inset in the main graph is a second graph which shows Raman power output (sum of forward and backward emission) vs. incident pump power; and, FIG. 7 shows cascading multiple Raman lasers along a single fiber.

The efficiency of the Raman oscillator was investigated by decreasing the pump power until a single emission wavelength was observed on the optical spectrum analyser (FIG. 6). The measured threshold is 86 microW for this 40-micrometer sphere. This value is nearly 1000 times lower than the corresponding values measured in previous work using microdroplets (45 mW for a 30-micrometer CS2 droplet), despite the fact that silica has a 1000 times lower Raman gain coefficient. This improvement of a factor of nearly $10^6$ results from efficient single WGM excitation, whereas free space beams (used previously) lack high spatial mode selectivity. Upon closer examination, the Raman emission in fact consisted of a number of separate simultaneously oscillating peaks (to the temporal resolution of the optical spectrum analyzer), corresponding to different azimuthal modes. The number of oscillating modes was typically 3–5, owing to the spatial selectivity of the fiber-taper. The measured unidirectional absolute conversion efficiency was 16%, with a differential quantum efficiency (CW and CCW oscillation) of 36%. In other microspheres tested Raman output powers as large as 200 microW have been obtained.

Fabrication of the microspheres and the fiber tapers is discussed in the above references and elsewhere including, for example, Knight, J. C., Cheung, G., Jacques, F., Birks, T. A. Phase-matched excitation of whispering-gallery-mode resonances by a fiber taper; Optics Letters 22, 1129–1131 (1997). The foregoing reference is also incorporated herein by reference. In summary, Silica microspheres can be fabricated by melting the tip of a standard telecommunication (SMF-28) fiber with a CO2 laser; surface tension creates a spherical volume with low eccentricities (~2%). Tapered optical fibers can be formed by heating and stretching a length of single-mode fiber. Typical taper diameters used in the laboratory tests described herein were approximately 1.5 micrometers with losses of less than 5%. Details of the fabrication of micro-spheres and tapers are given in the references cited and incorporated above. A polarization controller was used to adjust the incident polarization state at the sphere-taper junction to maximize the coupling efficiencies while preserving large values of Q. In these measurements, values of Q were in the low $10^8$ range, believed to be limited by surface scattering and OH absorption. Surface scattering also induces backscattering of power and couples the initially degenerate clockwise (CW) and counter-clockwise (CCW) circulating modes, causing a splitting of the resonance wavelength, in addition to a reduction of the circulating power (up to a factor of two).

In order to provide efficient coupling between the fiber taper 12 and the microsphere 9, a fiber taper diameter must be tailored for each different sphere size and WG mode of interest as described above. Fine tuning of the coupling can further be performed by changing the position of the sphere relative to the taper waist.

The resonant modes of nearly spherical dielectric particles can be classified according to their polarization index p, radial mode number n, and angular mode numbers 1 and m. Of special interest in this embodiment are the WGM resonances, i.e., those with small radial mode numbers and large angular mode numbers. Excitation of WGMs within glass microspheres 7 via a fiber-taper 12 coupling has several distinct advantages. Most important of these is direct coupling to and from the optical fiber. In addition, alignment is built in, fabrication is relatively simple, and as discussed above, index matching between the fiber taper 12 and the diameter of the WGMs of the microsphere 9 is possible.

As is illustrated in FIG. 6, the spectrum of a 70-micrometer diameter Raman microsphere laser with pump powers of 2 mW. The pump 20 is at 1555 nm. The peaks located around 1670 nm are Raman oscillation, separated by the FSR of the microsphere. The secondary lines around 1555 nm are due to FWM between the pump and two Raman waves.

The main graph in FIG. 5 illustrates the coupling gap and size dependence of the Raman threshold. This experiment was conducted for Raman oscillation threshold vs. taper sphere gap using a 40 micrometer diameter sphere ($Q_o=10^8$). The position is measured from the critical coupling point, where negative values correspond to the undercoupled regime. The minimum threshold occurs with the microsphere about 0.15 micrometer undercoupled, and corresponds to a transmission of 12%. The solid line represents a theoretical fit to the threshold equation. Inset in the figure is a graph showing that the normalized minimum threshold versus sphere size follows a quadratic dependence;

A graph illustrating single longitudinal mode Raman lasing is shown in FIG. 6. Here the Raman spectrum is illustrated for a 40-micrometer diameter microsphere, exhibiting a unidirectional conversion efficiency of 16% (pump is at 1555 nm). Inset in the graph of this figure is another graph which shows Raman power output (sum of forward and backward emission) vs. incident pump power. Laboratory experiment show the differential quantum efficiency is 36%.

As discussed above, this embodiment also maximizes the efficiency of the pumping of the microsphere 9 by providing a good match between the fundamental mode of the fiber taper 12 and the WG modes of the sphere 9 and by matching the input coupling strength to the roundtrip resonator loss (i.e., critical coupling). Owing to the large absorption within the microsphere 9 at the pump band and the subsequent large round-trip microsphere resonator loss, maximum power transfer is obtained for the fundamental WG modes (/m/=1), as the spatial overlap with the fiber taper 12 is highest for the equatorial modes, resulting in higher input coupling strengths. For this sphere, a taper diameter of 1.75 micrometers was used to phase match and selectively excite the lowest-order (n=1,2) fundamental WG modes of the sphere 9.

There are several ways to modify the performance of the preferred embodiment of the system described herein. Quality factors of $10^9$ have been achieved previously in fused-silica microspheres, which should lead to sub-microwatt Raman thresholds. The use of small spheres should improve Raman conversion efficiencies under increased pump power due to the increase in free spectral range, which decreases the efficiency of secondary Raman lines and Raman-assisted four-wave-mixing. Disks should allow true single-mode emission.

Additionally, the ability to achieve ultra-low-loss coupling between the resonator and the fiber taper suggests that compound resonant systems could be developed by attachment of multiple resonators along a single fiber taper 12 as illustrated in FIG. 7. As noted earlier, we have observed Raman and SBS oscillation as well as four-wave-mixing in these systems. These nonlinearities can be accessed in a compact volume through a nearly ideal field transport channel (optical fiber) and field coupling junction (the taper). As such, this system can also be used as a building block for the study of a host of nonlinearities within a high-Q silica resonator and potentially for generation of non-classical photon states and their efficient transport. Indeed, the compact nature of the system combined with the power of fiber field transport could afford relatively straightforward access to single or tandem resonant systems in normally challenging environments such as ultra-low-T chambers. The ability to load or suitably modify spheres using dopants or quantum dots could also be useful in such studies.

Lasing in the microsphere 9 is rather complex, owing to the large number of high-Q modes that are present in the sphere 9, the spatial selectivity of the pump 20, the loading of the sphere 9 as a result of the taper 12, the large spectral gain bandwidth, and the variations in the emission and absorption cross sections versus wavelength in the phosphate materials. For this reason other resonator geometries such as disks, rings or racetracks may be preferable to obtain a simplified resonator spectrum.

A further embodiment is the use of multiple resonators on a single fiber waveguide 5. This ability to cascade a series of devices is illustrated in FIG. 7, which shows cascading multiple Raman lasers along a single fiber. The arrow 22 represents the pump laser input wave. Each micro-resonator may emit a different Raman wave, indicated by the numbered 24, 26 and 28. The small size of the microresonator allows many devices to be placed in series along a single fiber, with the potential to control the properties of each device independently without affecting the others.

A system of the present invention can be made to create a Raman laser with threshold powers below 1 mW, whereas fiber Raman lasers typically require >100 mW. Additionally, the Raman generation is performed in a solid material with a volume of only about 100 micrometers per side. The preferred embodiment of the present invention uses plain silica glass (the same kind used in optical fibers). Silica has a very low Raman gain with respect to substances used in other work. By modifying the material in the preferred embodiment of the present device, the amount of gain can be increased.

The output frequency of the present invention can be tuned both by design (e.g., based on the positioning of the fiber waveguide relative to the micro-resonator and/or the choice of material from which to construct the micro-resonator) and dynamically (by varying the frequency of the laser pump signal). It is possible to write a grating directly on a microresonator, which can provide tuning mechanisms. It is also possible to change the output frequency by slightly changing the size, through for example heating the resonator or deforming it slightly.

The preferred embodiments of the present invention provides a micrometer-scale, nonlinear Raman source that has a highly efficient pump-signal conversion (higher than 35%) and pump thresholds nearly 1000 times lower than shown before for a comparable geometry. Thus, the present invention represents an overall improvement on the order of 106 times over prior devices based on liquid microdroplets and provides a route to compact, ultra-low threshold sources for numerous wavelength bands that are usually difficult to access. Equally important, this system can provide a compact and simple building block for studying nonlinear optical effects and the quantum aspects of light. Each of the preferred embodiments can be made to be robust and easy to implement in a variety of configurations and uses.

An alternative embodiment of the present invention includes the use of a coupling regime known as a "SPARROW" coupler, which consists of a silica planar waveguide on a silicon integrated chip. This type of coupler is discussed more fully in Laine J P, et. al, Microsphere resonator mode characterization by pedestal anti-resonant reflecting waveguide coupler, IEEE PHOTONIC TECH L 12 (8): 1004–1006 August 2000, the contents of which have been referred to above an incorporated herein in full by reference as if set forth in full hereat.

Configured as outlined above, the device of the present invention makes it possible to inject the waveguide power into the resonator very locally, so that all input power goes into a single resonator mode. This high "spatial mode overlap" between the coupler and resonator allows the attainment of the high power intensities needed for low threshold operation.

The Raman laser of the present invention can also be made to operate continuous wave by locking the pump laser to a WGM of the micro-resonator. This can be accomplished by number of different means such as tuning the micro-resonator 6 or the pump laser 20.

The present invention directly leads to a number of similar possibilities to improve and/c change performance of the Raman laser. The use of other materials (including coating of the resonator) may increase the efficiency of such a device. Alternate geometries are expected to allow better mode control, namely the possibility of suppressing unwanted laser output lines. Additionally, other structures can be integrated with the microresonator to change its properties, such as suppressing or enhancing certain wavelength outputs, changing the output wavelength, controlling the output power, etc. The coupling method may also be extended from a fiber-tapes to other waveguides, such that efficient coupling is still possible. This would allow integration of the microresonator into a "planar lightwave circuit", where these structures have the potential to be produced with planar technology, and thus integrated with other structures, such as passive components including filters and multiplexors, and active components including lasers and modulators.

Each of the characteristics in the present invention are believed to be new and unique, and are not found in the prior art. While the implementations described below are directed to embodiments of a laser which utilize a tapered fiber and a microsphere resonator, it will be understood by those skilled in the art that such configurations and/or combinations are merely embodiment of the present inventions. Thus, none of the embodiments are intended to be limitations on the scope of the invention described herein and set forth in the claims below.

We claim:

1. A Raman Laser comprising:
 a fiber waveguide, the fiber waveguide having a transverse optical coupling region positioned between a first portion and a second portion of the fiber waveguide;
 a dielectric micro-resonator, the micro-resonator and the fiber waveguide being substantially optically phase matched; and
 a laser pump, an output of the laser pump being optically connected to the first portion of the fiber waveguide,
 the fiber waveguide and the micro-resonator being arranged to permit the output of the laser pump to produce nonlinear optical effects within the micro-resonator, the nonlinear optical effects exciting Raman emissions in the micro-resonator, the laser output power being optically coupled to the fiber waveguide through the transverse optical coupling region.

2. The Raman Laser of claim 1, the nonlinear effects comprising distortion of the micro-resonator molecules.

3. The Raman Laser of claim 1, the micro-resonator comprising a spherical micro-resonator.

4. The Raman Laser of claim 3, the spherical micro-resonator being produced by heating a dielectric material, whereby the surface tension of the dielectric material creates a spherical volume.

5. The Raman Laser of claim 1, the micro-resonator comprising a disk, a ring, or a racetrack.

6. The Raman Laser of claim 3, the spherical micro-resonator supporting a whispering gallery resonant mode.

7. The Raman Laser of claim 3, the dielectric spherical micro-resonator comprising a fused silica spherical micro-resonator.

8. The Raman Laser of claim 1, the fiber waveguide comprising a silica fiber waveguide.

9. The Raman Laser of claim 1, the fiber waveguide being a cylindrical, an elliptical, an etched, a "D" shape or a "panda" waveguide.

10. The Raman Laser of claim 1, the stimulated Raman emissions including a peak centered around about 1670 nm.

11. The Raman Laser of claim 1, the fiber waveguide and the micro-resonator being arranged to excite stimulated Brillouin scattering.

12. The Raman Laser of claim 3, the spherical micro-resonator including a coating.

* * * * *